(12) United States Patent
Merkel

(10) Patent No.: US 6,300,263 B1
(45) Date of Patent: Oct. 9, 2001

(54) LOW-EXPANSION CORDIERITE GLASS CERAMICS

(75) Inventor: Gregory A. Merkel, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/465,871

(22) Filed: Dec. 16, 1999

(51) Int. Cl.$^7$ .................................................. C03C 10/08
(52) U.S. Cl. .................................. 501/9; 65/33.7; 264/631
(58) Field of Search .......................... 501/9; 65/33.7; 264/631

(56) References Cited

U.S. PATENT DOCUMENTS

| | | |
|---|---|---|
| 3,926,648 | 12/1975 | Miller . |
| 3,940,255 | 2/1976 | Harrington . |
| 4,015,048 | 3/1977 | Martin . |
| 4,063,955 | 12/1977 | Fritsch, Jr. et al. . |
| 4,142,879 | 3/1979 | Fritsch, Jr. et al. . |
| 4,191,583 | 3/1980 | Armistead et al. . |
| 4,219,344 | 8/1980 | Armistead et al. . |
| 4,225,354 | 9/1980 | Rao . |
| 4,292,080 | 9/1981 | Martin . |
| 5,250,474 | 10/1993 | Siebers . |
| 5,552,349 | 9/1996 | Ichii et al. . |
| 5,607,885 | 3/1997 | Ichii et al. . |
| 6,080,345 | * 6/2000 | Chalasani et al. .................... 264/631 |
| 6,210,626 | * 4/2001 | Cornelius et al. .................... 264/631 |

OTHER PUBLICATIONS

Ikawa, H et al. (1987) "Thermal expansion of cordierite ceramics—effects of doping with alkali and he treatments." Sintering '87. vol. 2. Proc. 4th Int. Symp. on Science and Technology of Sintering Tokyo, Nov. 1987, p. 854–859 Japan, Int. Inst. for the Science of Sintering; Elsevier Applied Science Publishers Ltd.

* cited by examiner

Primary Examiner—Karl Group
(74) Attorney, Agent, or Firm—L Rita Herzfeld

(57) ABSTRACT

A crystalline glass-ceramic article composed of a cordierite phase of cordierite crystals or aggregates of near-parallel crystallites, having a formula of either $Mg_2Al_4Si_5O_{18}$ or $A_xB_yMg_2Al_{4+x+2y}Si_{5-x-2y}O_{18}$. With the first formula, the average size of the cordierite crystals or aggregates is less than 70 micrometers, and the mean coefficient of thermal expansion from 22° C. to 800° C. (CTE) is less than $9\times10^{-7}/°$ C. With the second formula, A is either sodium or potassium, B is either strontium or barium, the sum of x and y is not less than 0.01, and when either x or y equal zero, the CTE is not more than $14\times10^{-7}/°$ C. The article is especially suitable as a filter or catalyst substrate. The article is made by providing a glass having a glass compositional formula expressed in moles of oxides of either $2MgO+2Al_2O_3+5SiO_2$ or $(x/2)A_2O+yBO+2MgO+[(4+x+2y)/2]Al_2O_3+(5-x-2y)SiO_2$, with A, B, and the sum of x and y as described above. The glass is melted, quenched, and crushed to a frit of median particle diameter no greater than 150 micrometers. The frit is consolidated into a body, which is then sintered for a sufficient time and temperature to devitrify the glass into a predominately cordierite-type phase and to coarsen the size of the cordierite crystals or aggregates of near-parallel crystallites to yield microcracks in the subsequently cooled body.

27 Claims, 1 Drawing Sheet

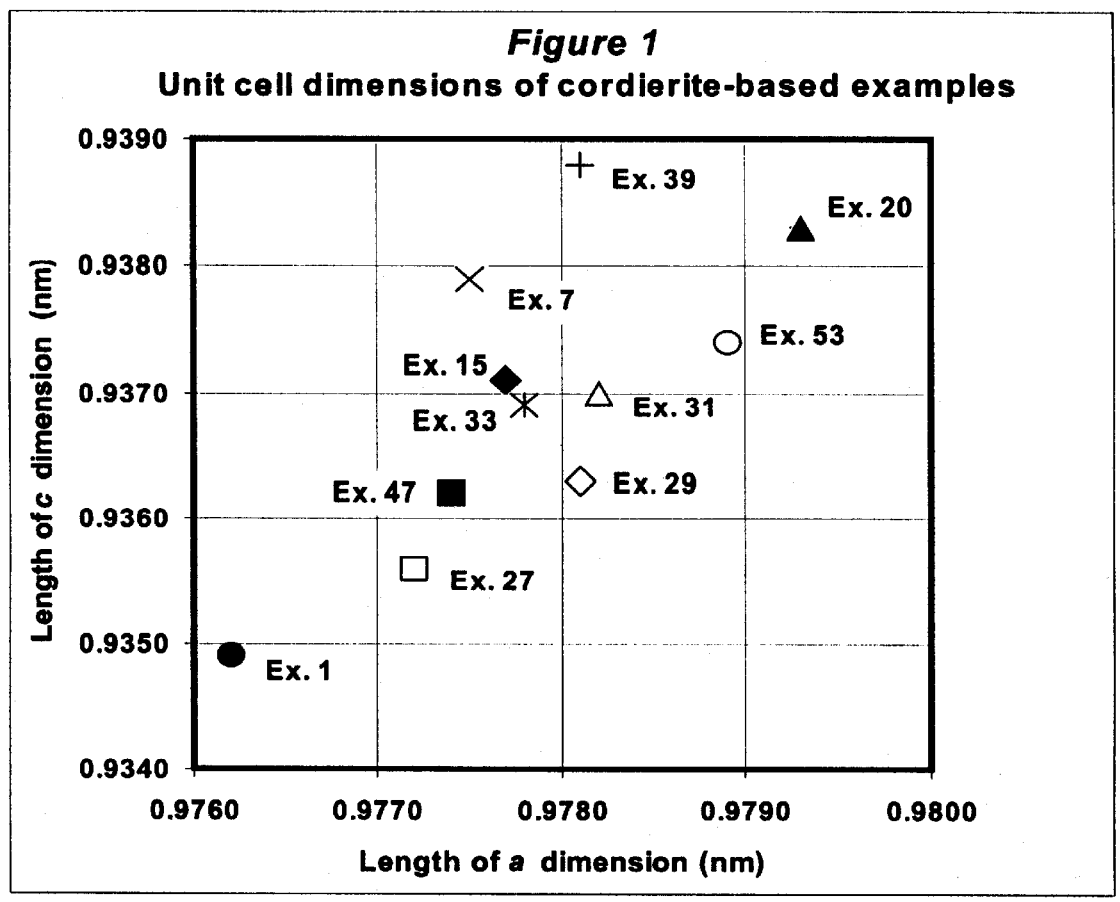

LOW-EXPANSION CORDIERITE GLASS CERAMICS

FIELD OF THE INVENTION

This invention relates to a family of low-expansion cordierite ceramic bodies made from glass frits, and methods of their fabrication.

BACKGROUND OF THE INVENTION

The realm of low-expansion cordierite bodies (CTE<10× $10^{-7}$/°C.) has previously been limited to ceramics prepared by firing mixtures of crystalline raw materials (e.g., clay+ talc+alumina) at temperatures above 1375° C. These low expansions rely largely upon microcracking, which is induced by the anisotropic thermal expansion/contraction of cordierite crystals or crystal aggregates that form as a consequence of the manner by which cordierite nucleates and grows from the reactive raw materials.

In extruded honeycomb bodies in which platelet-shaped particles of the raw materials tend to orient with their longest dimensions in the direction of extrusion, it is commonly observed that the cordierite crystals grow with their negative-expansion c-axes lying in the plane of the walls of the honeycomb. This feature further contributes to the lowering of the thermal expansion of the honeycomb body. However, the attainment of the proper microstructure required for these low expansions in conventional cordierite ceramic bodies is highly dependent on the chemistry, crystalline structural state, and particle sizes of the individual raw material components.

It would be highly desirable and an advancement in the art to have a method of making low-expansion cordierite bodies in which the low thermal expansion does not rely on preferred orientation of the cordierite crystallites and in which the thermal expansion coefficient is less sensitive to the chemistry, mineralogy, and particle size of the raw materials.

This invention provides such a method by utilizing certain glass frit powders.

SUMMARY OF THE INVENTION

In accordance with one aspect of the invention, there is provided a crystalline glass-ceramic article composed of a cordierite phase of cordierite crystals or aggregates of near-parallel crystallites, having a formula of either $Mg_2Al_4Si_5O_{18}$ or $A_xB_yMg_2Al_{4+x+2y}Si_{5-x-2y}O_{18}$. With the first formula, the average size of the cordierite crystals or aggregates is less than 70 micrometers, and the mean coefficient of thermal expansion from 22° C. to 800° C. (CTE) is less than $9 \times 10^{-7}$/° C. With the second formula, A is either sodium or potassium, B is either strontium or barium, the sum of x and y is not less than 0.01, and when either x or y equal zero, the CTE is not more than $14 \times 10^{-7}$/° C.

The article is especially suitable as a filter or catalyst substrate.

In accordance with another aspect of the invention, there is provided a method of making the article that involves providing a glass having a glass compositional formula expressed in moles of oxides of either $2MgO+2Al_2O_3+5SiO_2$ or $(x/2)A_2O+yBO+2MgO+[(4+x+2y)/2]Al_2O_3+(5-x-2y)SiO_2$, with A, B, and the sum of x and y as described above. The glass is melted, quenched, and crushed to a frit of median particle diameter no greater than 150 micrometers. The frit is consolidated into a body, which is then sintered for a sufficient time and temperature to devitrify the glass into a predominately cordierite-type phase and to coarsen the size of the cordierite crystals or aggregates of near-parallel crystallites to yield microcracks in the subsequently cooled body.

BRIEF DESCRIPTION OF THE DRAWING

FIG. 1 depicts the unit cell dimensions of some of the examples in the present application.

DETAILED DESCRIPTION OF THE INVENTION

The inventive bodies are essentially microcracked, predominately crystalline glass-ceramic articles consisting mainly of a cordierite phase which may be nearly pure $Mg_2Al_4Si_5O_{18}$ or may optionally contain structurally bound sodium, potassium, strontium, or barium in the normally vacant "channel site" of the cordierite crystal lattice.

When the composition of the cordierite phase is essentially $Mg_2Al_4Si_5O_{18}$, the average size of the cordierite crystals, or aggregates of crystallites having near-parallel crystallographic orientation, must be less than about 70 microns and the mean coefficient of thermal expansion from 22° C. to 800° C. must be less than about $9 \times 10^{-7}$/° C.

When the cordierite phase has the composition $A_xB_yMg_2Al_{4+x+2y}Si_{5-x-2y}O_{18}$ where A is either sodium or potassium and B is either strontium or barium, and the sum of x+y is not less than about 0.01, but where x or y alone may equal zero, the CTE is not more than about $14 \times 10^{-7}$/° C. Other cations such as lithium, rubidium, cesium, calcium, yttrium, lanthanum, and other rare earth metals may also be present in the cordierite phase, but preferably do not constitute more than about 1 weight percent of the ceramic body as the metal oxide. Preferred embodiments have CTEs of not more than 10, 9, 7 and even $5 \times 10^{-7}$/° C. It is preferred that the mean diameter of the cordierite crystals, or of aggregates of near-parallel crystallites, be between about 15 and about 50 microns, especially between about 35 and about 50 microns. Some preferred embodiments have porosities less than about 10%, which could be advantageous for strength. Other preferred embodiments have porosities greater than 15%, and may further have a preferred median pore size of less than about 20 microns, properties that could be advantageous for use as filters or for washcoating with high surface area catalyst supports. Some especially advantageous articles are (1) y being less than 0.01 and A being sodium, with the mean coefficient of thermal expansion from 22° to 800° C. being not more than about $9 \times 10^{-7}$/° C.;

(2) y being less than 0.01 and A being potassium, with the mean coefficient of thermal expansion from 22° to 800° C. being not more than about 7 or even $5 \times 10^{-7}$/° C.;

(3) x being less than 0.01, and B being strontium;

(4) x being less than 0.01, and B being barium, with the mean coefficient of thermal expansion from 22° to 800° C. being not more than about $9 \times 10^{-7}$/° C.

In all cases, the inventive bodies do not contain any additives that have conventionally been used as nucleating agents for cordierite-forming glasses, such as titania or zirconia.

The process for making the glass-ceramic article consists of melting and quenching a glass having a composition on a mole basis of $2MgO+2Al_2O_3+5SiO_2$, or $(x/2)A_2O+yBO+2MgO+[(4+x+2y)/2]Al_2O_3+(5-x-2y)SiO_2$, respectively, (where A, B, X, and Y are as defined above), crushing the glass to a frit having a median particle size not greater than about 150 microns, optionally mixing the glass frit with a binder, consolidating the glass frit into a body, and sintering at a sufficiently high temperature and for a sufficiently long time to devitrify the glass into cordierite or a cordierite crystalline solution and to promote adequate coarsening of the size of the crystals or aggregates of near-parallel crystallites to yield microcracks in the sintered article during cooling. The necessary frit size, sintering temperature, and soak time at temperature are dependent upon the inventive compositions employed.

It is found that when the glass frit particles sinter to one another and undergo devitrification, usually the cordierite phase appears to have first nucleated at isolated locations on the surfaces of the frit particles or at the interfaces between two frit particles. As the cordierite grows from these nuclei, it forms elongate, needle-like crystals which grow into the interior of the frit particles. This growth behavior eventually results in the formation of radiating, fanlike aggregates of acicular crystallites. When crystallization is essentially complete, each fanlike aggregate of needle-like crystallites terminates against the neighboring aggregates of crystallites in the interior of the original frit particle. Within a given aggregate, the crystallites are found to have a near-parallel crystallographic orientation to one another. This is demonstrated by examination of a petrographic thin section of the glass-ceramic body under cross-polarized transmitted light, with a ¼-wavelength plate inserted into the optical path to enhance the interference color associated with each crystal. Under these conditions of observation, each cordierite crystal appears as yellow, magenta, or blue, depending upon its crystallographic orientation with respect to the plane of polarization of the incident light. It is found that the cordierite crystallites within a given fan-like aggregate all exhibit the same interference color as one another, demonstrating that the crystallites all have a near-parallel crystallographic orientation. Thus, where the term "near-parallel" is used to describe the crystallites within a fan-like aggregate, it refers to the fact that crystallites within that aggregate have such similar crystallographic orientations to one another that they exhibit the same interference color when observed under the above conditions.

It is known that hexagonal cordierite exhibits different coefficients of thermal expansion along its a and c crystallographic axes. It is also known that if the cordierite crystals in a cordierite ceramic body grow to a certain minimum mean crystal size, the stresses generated between adjacent crystals during cooling after firing will result in microcracking if the adjacent crystals have a different crystallographic orientation from one another. This microcracking is know to lower the bulk coefficient of thermal expansion of the ceramic body.

Because cordierite crystallites within a given fan-like aggregate have near-parallel crystallographic orientation to one another, stresses within an aggregate are too low to generate microcracks within the aggregate. In fact, the near-parallel orientation of the crystallites causes the aggregate to behave almost as though it were a large single crystal of cordierite. However, because the cordierite crystallites within one aggregate generally have a different crystallographic orientation from the crystallites within an adjacent aggregate, sufficiently large stresses can be generated between aggregates to result in microcracking, provided that the aggregates exceed a certain minimum size. This microcracking, in turn, lowers the bulk coefficient of thermal expansion of the glass-ceramic body.

In general, higher sintering temperature and coarser frit median particle size are beneficial for increasing microcracking and decreasing CTE. Higher sintering temperatures result in greater stresses during cooling, and, thus, more microcracking. Also, coarser frit particle sizes allow for the growth of larger aggregates of sub-parallel cordierite crystallites, so that more aggregates will exceed the critical minimum size required to induce microcracking. The specific sintering temperature and frit median particle size required to achieved the desired low CTE also depend upon the composition of the cordierite phase in the glass-ceramic.

When the composition of the glass frit is essentially that of $Mg_2Al_4Si_5O_{18}$, the median particle size of the glass frit must be greater than about 20 microns, preferably greater than about 40 microns, and the firing temperature must be greater than 1050° C., preferably greater than about 1200° C.

When the composition of the glass frit is essentially that of $Na_xMg_2Al_{4+x}Si_{5-x}O_{18}$, where x is at least 0.01, then the firing temperature is preferably greater than about 1200° C.

When the composition of the glass frit is close to that of $K_xMg_2Al_{4+x}Si_{5-x}O_{18}$, where x is at least 0.01 but not more than about 0.15, the firing temperature is preferably greater than about 1200° C. The median particle size of the frit is preferably greater than 15 microns. When the median particle size of the frit is less than about 15 microns, the firing temperature must be greater than 1050° C. The firing temperature is preferably greater than 1200° C.

When the composition of the glass frit is close to that of $K_xMg_2Al_{4+x}Si_{5-x}O_{18}$, where x is greater than about 0.15 but not more than about 0.35, then when the median particle size of the frit is less than about 20 microns, the firing temperature must be greater than about 1200° C. It is further preferred that the frit size be at least 20 microns, in which case it is still further preferred that the firing temperature be greater than 1200° C.

When the composition of the glass frit is close to that of $K_xMg_2Al_{4+x}Si_{5-x}O_{18}$, where x is greater than about 0.35 but not more than about 0.6, then when the median particle size of the frit is less than about 20 microns the firing temperature must be greater than about 1200° C. and is preferably greater than 1300° C. It is preferred that the median particle size of the frit be at least about 20 microns and especially preferred that it be at least about 35 microns. When the median particle size of the frit is at least 20 microns, the firing temperature is preferably greater than 1200° C.

When the composition of the glass frit is close to that of $Sr_yMg_2Al_{4+2y}Si_{5-2y}O_{18}$, where y is greater than 0.01 but not more than 0.20, the median particle size of the frit is preferably at least 20 microns.

When the composition of the glass frit is close to that of $Sr_yMg_2Al_{4+2y}Si_{5-2y}O_{18}$, where y is greater than 0.2 but less than 0.5, the firing temperature must be less than about 1325° C. and the median particle size of the frit is preferably at least 20 microns.

When the composition of the glass frit is close to that of $Ba_yMg_2Al_{4+2y}Si_{5-2y}O_{18}$, the value of y is at least 0.01 but must be less than about 0.25, and when the median particle size of the frit is less than 20 microns, the firing temperature must be greater than about 1200° C. The median particle size of the frit is preferably greater than 20 microns.

The glass powder that is used as a starting material should be free of pre-reacted cordierite particles. Furthermore, the glass frit composition should contain no more than trace amounts of oxides that heretofore have been practiced as nucleation aids for other cordierite glass-ceramics, such as zirconium oxide or titanium oxide.

The inventive means for producing a thermal shock resistant cordierite body with a CTE less than $14\times10^{-7}/°$ C., and preferably less than $9\times10^{-7}/°$ C., by using certain glass frit starting materials could be advantageous for the following reasons:

1. The chemistry and particle size of only a single raw material, the glass frit, must be controlled.

2. Commodity grade feed materials could be used in forming the original glass, in place of the highly specified clays, calcined clays, talcs, and aluminas presently used to form low-expansion cordierite ceramics.

3. The particle size and sintering conditions of the glass frit could also be manipulated to achieve specific conditions of porosity in the fired body without affecting CTE, whereas changing the particle size of one or more of the crystalline raw materials in the fabrication of cordierite ceramics from clay+talc+alumina batches often results in an increase in CTE.

4. Sintering temperatures less than 1350° C., and even as low as 1050° C., can be employed, opening up opportunities for savings in kilns, kiln furniture, and energy usage.

To more fully illustrate the invention, the following non-limiting examples are presented. All parts, portions, and percentages are on a weight basis unless otherwise stated.

In all of the following inventive and comparative examples, 5000 grams of raw materials were ball milled together and subsequently melted in a platinum crucible at 1650° C. for 16 hours. The melt was quenched by pouring into water, and the resulting glass fragments were ball milled to the desired median particle size. Each batch of glass frit was dry blended with 1% sodium stearate and 8 to 10% methyl cellulose binder, and the powders were then mixed with about 25 to 28% deionized water in a stainless steel muller to impart plasticity to the batch. The plasticized material was subsequently extruded as 5/16 inch diameter rod which was cut into segments, placed in glass tubes, and dried in an oven at 95° C. for three days. Median particle sizes of the glass frits were measured by a laser diffraction technique.

Segments of rod were placed on coarse alumina sand in alumina boxes and heated at 100° C./hour to a maximum temperature of 1050° to 1325° C. and held for 6 to 10 hours. Samples were cooled by shutting off power to the furnace. Crystalline phases in the samples were characterized by powder x-ray diffraction. For selected samples, the a and c unit cell dimensions of the cordierite phase were determined at room temperature using x-ray diffraction. The a dimension was derived from the position of the (220) reflection and the c dimension was derived from the position of the (004) reflection. Peak positions were corrected using the (110) reflection of an alpha-alumina internal standard. Coefficient of thermal expansion was measured from 22° to 800° C. by dilatometry. Mercury porosimetry was performed to determine volume percent porosity and median pore size of some examples.

Petrographic thin sections were prepared from some of the specimens. These were examined in cross-polarized transmitted light with a ¼-wavelength plate inserted into the optical path to enhance the interference colors. Under these conditions of observation, each cordierite crystal appears as either yellow, magenta, or blue, depending upon its crystallographic orientation within the thin section of the sample. It was found that the cordierite existed either as large individual crystals or as radiating aggregates of smaller prismatic or acicular crystallites whose crystallographic axes were near-parallel to one another within the aggregate. Color micrographs were taken at magnifications of 100× and 200×. The mean size of the cordierite crystals or aggregates of near-parallel crystallites within a given sample was determined by measuring the widths of approximately 15 to 60 crystals or crystallite aggregates and taking the average. An aggregate of near-parallel cordierite crystallites was counted as a single crystal and its width counted as the crystal size. Thus, in the following examples, the reported "crystal size" is the width of a region appearing as either blue or yellow in the micrograph. Such regions may represent single crystals, or aggregates of smaller crystallites that have near-parallel crystallographic orientation with respect to one another. Because an aggregate of near-parallel cordierite crystallites behaves much the same as a single crystal of cordierite having the same size as the aggregate in its tendency to cause microcracking and lowering of CTE, it is not important to distinguish whether a region of a given color is an aggregate or a large, single crystal.

In the examples, the amounts of the metal oxide constituents of the glass compositions were chosen such that the molar ratios of these metal oxides with one another correspond to the general formula $(x/2)A_2O+yBO+2MgO+[(4+x+2y)/2]Al_2O_3+(5-x-2y)SiO_2$, where "A" represents an alkali metal of Group IA of the periodic table, and "B" represents an alkaline earth metal other than beryllium or magnesium of Group IIA of the periodic table. This formula corresponds to a cordierite type phase of the general formula $A_xB_yMg_2Al_{4+x+2y}Si_{5-x-2y}O_{18}$. When there are no alkali or alkaline earth metals present, this formula reduces to that of "unsubstituted" magnesium cordierite, $Mg_2Al_4Si_5O_{18}$. The incorporation of the positively charged alkali or alkaline earth cations into the cordierite crystal structure is balanced by an increase in the ratio of trivalent aluminum (3+) to tetravalent (4+) silicon in the structure. A cordierite type phase in which alkali or alkaline earth metals are present in the structure is then referred to as a substituted cordierite. It is believed that these cations mainly enter the so-called "channel site" in the cordierite crystal structure. This site is vacant in pure $Mg_2Al_4Si_5O_{18}$.

Examples of inventive and non-inventive ("comparison") bodies and methods are provided in Tables 1 to 9.

Examples 1 to 6 show that when a glass frit having a composition near to that of unsubstituted magnesium cordierite, $Mg_2Al_4Si_5O_{18}$, is held at a temperature of 10500° to 1325° C., the glass crystallizes to a hexagonal cordierite phase with only trace amounts of spinel ($MgAl_2O_4$). Example 1 establishes the a and c dimensions of the $Mg_2Al_4Si_5O_{18}$ cordierite unit cell to be 0.9762 nm and 0.9349 nm, respectively. These unit cell parameters are plotted in FIG. 1. The examples show that, when the glass frit is lacking sodium, potassium, strontium, or barium, the median particle size of the frit must be greater than about 20 microns in order to obtain a predominately crystalline body with a mean CTE (22–800° C.) of less than about $9\times10^{-7}/°$ C. Examples 3 to 6 illustrate that, when the median particle size of the starting frit is greater than about 20 microns, the bodies must be heated to a temperature greater than 1050° C. in order to achieve a mean CTE less than $9\times10^{-7}/°$ C. Examples 2 and 4 show that the decrease in CTE for coarser frit is associated with an increase in the mean size of the cordierite crystals from 36 microns to 62 microns. Examples 4 and 6 further show that, in addition to low CTE, these bodies also contain a substantial amount of porosity, allowing their use in applications where permeability is desired.

Examples 7 to 10 demonstrate that inventive bodies comprised mainly of a sodium-containing cordierite phase can be obtained by sintering and crystallizing compacted bodies of sodium magnesium aluminosilicate glass frits which have compositions corresponding to the sodium-containing cordierite $Na_{0.25}Mg_2Al_{4.25}Si_{4.75}O_{18}$. Low CTEs of not more than $14\times10^{-7}/°$ C. are achieved for a wide range of frit particle sizes and sintering temperatures, and articles consist almost entirely of a cordierite type phase with very small amounts of spinel. The incorporation of sodium into the cordierite crystal structure is verified by the increase in the a and c unit cell dimensions of the cordierite crystals in Example 7 relative to $Mg_2Al_4Si_5O_{18}$ cordierite (Example 1), as shown in FIG. 1. Heating to temperatures greater than about 1200° C. is especially useful for attaining CTEs less than about $9\times10^{-7}/°$ C. The mean cordierite crystal sizes of Examples 7 and 8 are 38 and 37 microns, respectively. Examples 8 and 10 show that lower amounts of porosity are achieved with the addition of sodium to the glass.

Examples 11 to 14 illustrate that articles prepared by heating compacted bodies of potassium containing magnesium aluminosilicate glass frits corresponding to the cordierite composition $K_{0.125}Mg_2Al_{4.125}Si_{4.875}O_{18}$ can exhibit low CTEs of not more than $14\times10^{-7}/°$ C. Sintered bodies consist of a cordierite type phase with very small amounts of spinel or leucite. When the median particle size of the frit is less than about 15 microns, the firing temperature must be greater than about 1050° C. The sintering temperature is preferably greater than about 1200° C., whereby CTEs less than $9\times10^{-7}/°$ C. are obtained. The median particle size of the frit is preferably greater than 15 microns. Examples 12 and 14 show that, depending upon the frit particle size, a broad range in percent porosity and pore size can be obtained.

Examples 15 to 19 show that even lower CTEs can be obtained by heating and crystallizing a compacted body of a glass frit having a composition equivalent to $K_{0.25}Mg_2Al_{4.25}Si_{4.75}O_{18}$. The fired ceramics consist of potassium-cordierite type phase with traces of spinel, and the incorporation of potassium into the crystal structure of the cordierite is confirmed by the increase in the a and c unit cell dimensions of Example 15 relative to Example 1, as seen in FIG. 1. When the median particle size of the frit is less than about 20 microns, the firing temperature must be greater than about 1200° C. Especially low CTEs of not more than $7\times10^{-7}/°$ C. can be attained for coarser frit sizes. Porosities in excess of 20% by volume are retained.

Examples 20 to 26 demonstrate that remarkably low CTEs can be achieved by sintering articles of compacted glass frits whose compositions correspond to the formula $K_{0.5}Mg_2Al_{4.5}Si_{4.5}O_{18}$. The sintered bodies consist of a potassium-cordierite type phase with traces of spinel, and the large a and c unit cell dimensions of the cordierite phase in Example 20 confirm that the potassium has entered the cordierite crystal structure (FIG. 1). When the median particle size of the glass frit is less than about 20 microns, the firing temperature must be greater than about 1200° C. However, when the median particle size of the frit is greater than about 20 microns, especially low CTEs of 4 to $6\times10^{-7}/°$ C. are obtained for a broad range of firing temperatures. Mean cordierite crystal sizes remain less than about 50 microns, as seen for Examples 23 and 24. A range in porosity and median pore size is also achievable.

Example 27 shows that a compacted glass frit having a median particle size of 11 microns and a composition corresponding to the formula $Li_{0.25}Mg_2Al_{4.25}Si_{4.75}O_{18}$ can be crystallized to a lithium-containing cordierite phase with only trace amounts of spinel and beta-eucryptite at 1050° C. Incorporation of lithium into the cordierite crystal structure is confirmed by the increase in the a and c unit cell dimensions (FIG. 1). However, even when the median particle size of the frit is increased to 36 microns and the firing temperature is increased to 1325° C. (Example 28), the CTE is still greater than $14\times10^{-7}/°$ C., outside the range of the present invention.

Examples 29 to 32 demonstrate that ceramics made from compacted bodies of glass frits having the compositions $Rb_{0.25}Mg_2Al_{4.25}Si_{4.75}O_{18}$ or $Cs_{0.25}Mg_2Al_{4.25}Si_{4.75}O_{18}$ consist of rubidium-containing cordierite or cesium-containing cordierite with only trace amounts of spinel. The substitution of the alkalis into the cordierite crystal structure is confirmed by the larger a and c unit cell parameters for Examples 29 and 31 (FIG. 1). However, the CTEs of these bodies are greater than $14\times10^{-7}/°$ C., and therefore lie outside the range of the present invention, even when the median particle size of the frit is about 40 microns and the bodies are fired at 1325° C.

Examples 33 to 38 illustrate that ceramic bodies with CTEs less than $14\times10^{-7}/°$ C. can be obtained by sintering and crystallizing a compact of glass frit having the composition $Sr_{0.125}Mg_2Al_{4.25}Si_{4.75}O_{18}$. Inventive bodies are obtained for frits having a median particle size ranging from at least as fine as 15 microns to at least as coarse as 94 microns, and for firing temperatures at least as low as 1050° C. to at least as high as 1325° C. The ceramics consist of a strontium-containing cordierite phase with spinel and $SrAl_2Si_2O_8$ present in trace amounts when fired at 1050° C., increasing to minor amounts when fired at 1325° C. The presence of strontium in the cordierite crystal structure is corroborated by the larger a and c unit cell dimensions of Example 33 relative to unsubstituted cordierite (FIG. 1). The mean size of the cordierite crystals is found to range from about 20 to 43 microns. Examples 35 and 36 show that porosity is retained in these bodies after firing.

Examples 39 to 42 show that cordierite ceramics having CTEs of not more than $14\times10^{-7}/°$ C. can be obtained from a compacted body of a glass frit having a median particle size of 14 microns and a composition corresponding to $Sr_{0.25}Mg_2Al_{4.5}Si_{4.5}O_{18}$ by heating said body to a temperature greater than 1150° C. but less than 1325° C. Such articles contain a strontium-containing cordierite phase with minor amounts of $SrAl_2Si_2O_8$ and trace to minor amounts of spinel. The presence of strontium in the cordierite crystal structure is confirmed by the increase in the a and c unit cell dimensions of Example 39 relative to Example 1 (FIG. 1). Examples 43 to 46 demonstrate that even lower CTEs are obtained by increasing the median particle size of the frit to greater than 20 microns, in which case the firing temperature must be less than about 1325° C., but maybe at least as low as about 1050° C. Examples 43 and 45 show that porosity is still retained in the low-CTE bodies.

Examples 47 to 50 illustrate that heating a compacted body of a glass frit having a median particle size of 16 microns and a composition of $Ba_{0.125}Mg_2Al_{4.25}Si_{4.75}O_{18}$ to a temperature of at least 1200° C. yields a barium-containing cordierite ceramic having a CTE of not more than $14\times10^{-7}/°$ C. Spinel and celsian ($BaAl_2Si_2O_8$) are present in minor amounts in the inventive bodies. The larger unit cell parameters of the cordierite in Example 47 relative to Example 1 indicate that the barium has entered the crystal structure of the cordierite (FIG. 1). Examples 51 and 52 show that CTEs as low as about $7\times10^{-7}/°$ C. are achieved for this glass frit composition when the median particle size of the frit is greater than about 20 microns. The cordierite crystal size of these low CTE bodies is determined to be about 40 microns. A range of porosity and pore size is achievable.

Examples 53 and 54 show that when the amount of barium in the glass frit is increased to 6.19% by weight (0.25 barium atoms per 18 oxygen atoms), the body consists of a barium containing cordierite as indicated by the increase in unit cell dimensions (FIG. 1); however, the CTE of the sintered and crystallized ceramic is greater than $14\times10^{-7}/°$ C.

TABLE 1

| EXAMPLE NUMBER | 1* | 2* | 3* | 4 | 5* | 6 |
|---|---|---|---|---|---|---|
| NOMINAL COMPOSITION OF CORDIERITE PHASE | | | $Mg_2Al_4Si_5O_{18}$ | | | |
| OXIDE PERCENT IN GLASS | | | | | | |
| MgO | 3.80 | 13.80 | 13.80 | 13.80 | 13.80 | 13.80 |
| $Al_2O_3$ | 34.80 | 34.80 | 34.80 | 34.80 | 34.80 | 34.80 |
| $SiO_2$ | 51.30 | 51.30 | 51.30 | 51.30 | 51.30 | 51.30 |
| $Na_2O$ | 0.00 | 0.00 | 0.00 | 0.00 | 0.00 | 0.00 |
| Median Particle Size of Glass Frit (microns) | 17 | 17 | 44 | 44 | 120 | 120 |
| SOAK TEMPERATURE (° C.) | 1050 | 1325 | 1050 | 1325 | 1050 | 1325.00 |
| SOAK TIME (hours) | 10 | 6 | 10 | 6 | 10 | 6 |
| FIRED PROPERTIES | | | | | | |
| Major crystalline phases** | Cd | Cd | Cd | Cd | Cd | Cd |
| Minor crystalline phases** | — | — | — | — | | |
| Trace crystalline phases** | Sp | Sp | — | Sp | Sp | Sp |
| Cordierite a parameter (nm) | 0.9762 | — | — | — | — | — |
| Cordierite c parameter (nm) | 0.9349 | — | — | — | — | — |
| Cordierite mean crystal size (microns) | — | 36 | — | 62 | — | — |
| CTE 25–800° C. ($10^{-7}$/° C.) | 15.2 | 14.1 | 11.4 | 7.4 | 10.9 | 8.5 |
| Percent Open Porosity | — | — | — | 37.5 | — | 41.2 |
| Median Pore Diameter (microns) | — | — | — | 8.8 | — | 14.7 |

*Comparison Example
**Cd = cordierite-type phase, Sp = spinel

TABLE 2

| EXAMPLE NUMBER | 7 | 8 | 9 | 10 |
|---|---|---|---|---|
| NOMINAL COMPOSITION OF CORDIERITE PHASE | | $Na_{0.25}Mg_2Al_{4.25}Si_{4.75}O_{18}$ | | |
| OXIDE PERCENT IN GLASS | | | | |
| MgO | 13.60 | 13.60 | 13.60 | 13.60 |
| $Al_2O_3$ | 136.701 | 36.70 | 36.70 | 36.70 |
| $SiO_2$ | 48.30 | 48.30 | 48.30 | 48.30 |
| $Na_2O$ | 1.31 | 1.31 | 1.31 | 1.31 |
| Median Particle Size of Glass Frit (microns) | 11 | 11 | 34 | 34 |
| SOAK TEMPERATURE (° C.) | 1050 | 1325 | 1050 | 1325 |
| SOAK TIME (hours) | 10 | 6 | 10 | 6 |
| FIRED PROPERTIES | | | | |
| Major crystalline phases** | Cd | Cd | Cd | Cd |
| Minor crystalline phases** | — | — | — | — |
| Trace crystalline phases** | SP | Sp | Sp | S |
| Cordierite a parameter (nm) | 0.9775 | — | — | — |
| Cordierite c parameter (nm) | 0.9379 | — | — | — |
| Cordierite mean crystal size (microns) | 38 | 37 | — | — |
| CTE 25–800° C. ($10^{-7}$/° C.) | 14.0 | 6.8 | 13.7 | 8.7 |
| Percent Open Porosity | — | 7.2 | — | 19.1 |
| Median Pore Diameter (microns) | — | — | — | 5.9 |

**Cd = cordierite-type phase, Sp = spinel

TABLE 3

| EXAMPLE NUMBER | 11* | 12 | 13 | 14 |
|---|---|---|---|---|
| NOMINAL COMPOSITION OF CORDIERITE PHASE | | $K_{0.125}Mg_2Al_{4.125}Si_{4.875}O_{18}$ | | |
| OXIDE PERCENT IN GLASS | | | | |
| MgO | 13.70 | 13.70 | 13.70 | 13.70 |
| $Al_2O_3$ | 35.60 | 35.60 | 35.60 | 35.60 |
| $SiO_2$ | 49.60 | 49.60 | 49.60 | 49.60 |
| $K_2O$ | 0.99 | 0.99 | 0.99 | 0.99 |
| Median Particle Size of Glass Frit (microns) | 10 | 10 | 41 | 41 |
| SOAK TEMPERATURE (° C.) | 1050 | 1325 | 1050 | 1325 |
| SOAK TIME (hours) | 10 | 6 | 10 | 6 |
| FIRED PROPERTIES | | | | |
| Major crystalline phases** | Cd | Cd | Cd | Cd |
| Minor crystalline phases** | — | — | — | — |
| Trace crystalline phases** | Sp | Leuc | Sp | Sp |
| Cordierite a parameter (nm) | — | — | — | — |
| Cordierite c parameter (nm) | — | — | — | — |
| Cordierite mean crystal size (microns) | — | — | — | — |
| CTE 25–800° C. ($10^{-7}$/° C.) | 14.5 | 8.9 | 12.2 | 8.1 |
| Percent Open Porosity | — | 11.4 | — | 27.4 |
| Median Pore Diameter (microns) | — | 12 | — | 11.5 |

*Comparison Example
**Cd = cordierite-type phase, Sp = spinel, Leuc= leucite

TABLE 4

| EXAMPLE NUMBER | 15* | 16* | 17 | 18 | 19 |
|---|---|---|---|---|---|
| NOMINAL COMPOSITION OF CORDIERITE PHASE | $K_{0.25}Mg_2Al_{4.25}Si_{4.75}O_{18}$ | | | | |
| OXIDE PERCENT IN GLASS | | | | | |
| MgO | 13.50 | 13.50 | 13.50 | 13.50 | 13.50 |
| $Al_2O_3$ | 36.40 | 36.40 | 36.40 | 36.40 | 36.40 |
| $SiO_2$ | 48.00 | 48.00 | 48.00 | 48.00 | 48.00 |
| $K_2O$ | 1.98 | 1.98 | 1.98 | 1.98 | 1.98 |
| Median Particle Size of Glass Frit (microns) | 14 | 14 | 14 | 37 | 125 |
| SOAK TEMPERATURE (° C.) | 1050 | 1150 | 1325 | 1325 | 1325 |
| SOAK TIME (hours) | 10 | 10 | 6 | 6 | 6 |
| FIRED PROPERTIES | | | | | |
| Major crystalline phases** | Cd | Cd | Cd | Cd | Cd |
| Minor crystalline phases** | — | — | — | — | — |
| Trace crystalline phases** | Sp | Sp | Sp | Sp | Sp |
| Cordierite a parameter (nm) | 0.9777 | — | — | — | — |
| Cordierite c parameter (nm) | 0.9371 | — | — | — | — |
| Cordierite mean crystal size (microns) | — | — | — | — | — |
| CTE 25–800° C. ($10^{-7}$/° C.) | 16.5 | 17.0 | 10.8 | 7.0 | 6.3 |
| Percent Open Porosity | — | — | — | 22.4 | 36.5 |
| Median Pore Diameter (microns) | — | — | — | 4.8 | 10.1 |

*Comparison Example
**Cd = cordierite-type phase, Sp = spinel

TABLE 5

| EXAMPLE NUMBER | 20* | 21* | 22 | 23 | 24 | 25 | 26 |
|---|---|---|---|---|---|---|---|
| NOMINAL COMPOSITION OF CORDIERITE PHASE | $K_{0.5}Mg_2Al_{4.5}Si_{4.5}O_{18}$ | | | | | | |
| OXIDE PERCENT IN GLASS | | | | | | | |
| MgO | 13.30 | 13.30 | 13.30 | 13.30 | 13.30 | 13.30 | 13.30 |
| $Al_2O_3$ | 37.90 | 37.90 | 37.90 | 37.90 | 37.90 | 37.90 | 37.90 |
| $SiO_2$ | 44.70 | 44.70 | 44.70 | 44.70 | 44.70 | 44.70 | 44.70 |
| $K_2O$ | 3.90 | 3.90 | 3.90 | 3.90 | 3.90 | 3.90 | 3.90 |
| Median Particle Size of Glass Frit (microns) | 13 | 13 | 13 | 40 | 40 | 120 | 120 |
| SOAK TEMPERATURE ° C. | 1050 | 1150 | 1325 | 1050 | 1325 | 1050 | 1325 |
| SOAK TIME (hours) | 10 | 10 | 10 | 10 | 6 | 10 | 6 |
| FIRED PROPERTIES | | | | | | | |
| Major crystalline phases** | Cd | Cd | Cd | Cd | Cd | Cd | Cd |
| Minor crystalline phases** | — | — | — | — | — | — | — |
| Trace crystalline phases** | Sp | Sp | Sp | Sp | Sp | Sp | Sp |
| Cordierite a parameter (nm) | 0.9793 | — | — | — | — | — | — |
| Cordierite c parameter (nm) | 0.9383 | — | — | — | — | — | — |
| Cordierite mean crystal size (microns) | — | — | — | 44 | 45 | — | — |
| CTE 25–800° C. ($10^{-7}$/° C.) | 18.7 | 19.6 | 12.7 | 5.7 | 4.0 | 4.5 | 3.9 |
| Percent Open Porosity | — | — | — | 10.0 | 8.8 | 17.3 | 19.5 |
| Median Pore Diameter (microns) | — | — | — | — | — | 7.5 | 9.1 |

*Comparison Example. Example 20 also contained the addition of 5% crystalline cordierite powder in the extruded batch.
**Cd = cordierite-type phase, Sp = spinel

TABLE 6

| EXAMPLE NUMBER | 27* | 28* | 29* | 30* | 31* | 32* |
|---|---|---|---|---|---|---|
| NOMINAL COMPOSITION OF CORDIERITE PHASE | $Li_{0.25}Mg_2Al_{4.25}Si_{4.75}O_{18}$ | | $Rb_{0.25}Mg_2Al_{4.25}Si_{4.75}O_{18}$ | | $Cs_{0.25}Mg_2Al_{4.25}Si_{4.75}O_{18}$ | |
| OXIDE PERCENT IN GLASS | | | | | | |
| MgO | 13.70 | 13.70 | 13.30 | 13.30 | 13.00 | 13.00 |
| $Al_2O_3$ | 36.90 | 36.90 | 35.70 | 35.70 | 35.00 | 35.00 |
| $SiO_2$ | 48.60 | 48.60 | 47.00 | 47.00 | 46.10 | 46.10 |
| $Li_2O$ | 0.64 | 0.64 | 0.00 | 0.00 | 0.00 | 0.00 |
| $Rb_2O$ | 0.00 | 0.00 | 3.86 | 3.86 | 0.00 | 0.00 |

TABLE 6-continued

| EXAMPLE NUMBER | 27* | 28* | 29* | 30* | 31* | 32* |
|---|---|---|---|---|---|---|
| NOMINAL COMPOSITION | | | | | | |
| Cs$_2$O | 0.00 | 0.00 | 0.00 | 0.00 | 5.70 | 5.70 |
| Median Particle Size of Glass Frit (microns) | 1 | 36 | 13 | 39 | 11 | 41 |
| SOAK TEMPERATURE (° C.) | 1050 | 1325 | 1050 | 1325 | 1050 | 1325 |
| SOAK TIME hours | 10 | 6 | 10 | 6 | 10 | 6 |
| FIRED PROPERTIES | | | | | | |
| Major crystalline phases** | Cd | Cd | Cd | Cd | Cd | Cd |
| Minor crystalline phases** | — | Sp, Spod | — | — | — | — |
| Trace crystalline phases** | Sp, Eucr | — | Sp | Sp | Sp | Sp |
| Cordierite a parameter (nm) | 0.9772 | — | 0.9781 | — | 0.9782 | — |
| Cordierite c parameter (nm) | 0.9356 | — | 0.9363 | — | 0.9370 | — |
| Cordierite mean crystal size (microns) | — | — | — | — | — | — |
| CTE 25-800° C. (10$^{-7}$/° C.) | 19.2 | 14.4 | 18.6 | 15.9 | 15.8 | 14.9 |

*Comparison Example. Example 27 also contained the addition of 5% crystalline cordierite powder in the extruded batch.
**Cd = cordierite-type phase, Sp = spinel, Eucr = beta-eucryptite, Spod = beta-spodumene

TABLE 7

| EXAMPLE NUMBER | 33 | 34 | 35 | 36 | 37 | 38 |
|---|---|---|---|---|---|---|
| NOMINAL COMPOSITION OF CORDIERITE PHASE | Sr$_{0.125}$Mg$_2$Al$_{4.25}$Si$_{4.75}$O$_{18}$ | | | | | |
| OXIDE PERCENT IN GLASS | | | | | | |
| MgO | 13.5 | 13.5 | 13.5 | 13.5 | 13.5 | 13.5 |
| Al2O3 | 36.3 | 36.3 | 36.3 | 36.3 | 36.3 | 36.3 |
| SiO2 | 47.9 | 47.9 | 47.9 | 47.9 | 47.9 | 47.9 |
| SrO | 2.17 | 2.17 | 2.17 | 2.17 | 2.17 | 2.17 |
| Median Particle Size of Glass Frit (microns) | 15 | 15 | 44 | 44 | 94 | 94 |
| SOAK TEMPERATURE (° C.) | 1050 | 1325 | 1050 | 1325 | 1050 | 1325 |
| SOAK TIME (hours) | 10 | 10 | 10 | 6 | 10 | 6 |
| FIRED PROPERTIES | | | | | | |
| Major crystalline phases | Cd | Cd | Cd | Cd | Cd | Cd |
| Minor crystalline phases | — | Sp, SrAS | — | Sp, SrAS | — | Sp, SrAS |
| Trace crystalline phases | Sp, SrAS | — | Sp, SrAS | — | Sp, SrAS | — |
| Cordierite a parameter (nm) | 0.9778 | — | — | — | — | — |
| Cordierite c parameter (nm) | 0.9369 | — | — | — | — | — |
| Cordierite mean crystal size (microns) | 20 | — | 43 | — | 42 | — |
| CTE 25-800° C. (10$^{-7}$/° C.) | 13.8 | 13.8 | 10.7 | 10.3 | 10.7 | 10.2 |
| Percent Open Porosity | — | — | 18.6 | 18.4 | — | — |
| Median Pore Diameter (microns) | — | — | 7.1 | 6.7 | — | — |

**Cd = cordierite-type phase, Sp = spinel, SrAS = SrAl$_2$Si$_2$O$_8$

TABLE 8

| EXAMPLE NUMBER | 39* | 40* | 41 | 42* | 43 | 44* | 45 | 46* |
|---|---|---|---|---|---|---|---|---|
| NOMINAL COMPOSITION OF CORDIERITE PHASE | Sr$_{0.25}$Mg$_2$Al$_{4.5}$Si$_{4.5}$O$_{18}$ | | | | | | | |
| OXIDE PERCENT | | | | | | | | |
| MgO | 13.30 | 13.30 | 13.30 | 13.30 | 13.30 | 13.30 | 13.30 | 13.30 |
| Al$_2$O$_3$ | 37.80 | 37.80 | 37.80 | 37.80 | 37.80 | 37.80 | 37.80 | 37.80 |
| SiO$_2$ | 44.50 | 44.50 | 44.50 | 44.50 | 44.50 | 44.50 | 44.50 | 44.50 |
| SrO | 4.27 | 4.27 | 4.27 | 4.27 | 4.27 | 4.27 | 4.27 | 4.27 |
| Median Particle Size of Glass Frit (microns) | 14 | 14 | 14 | 14 | 41 | 41 | 93 | 93 |

TABLE 8-continued

| EXAMPLE NUMBER | 39* | 40* | 41 | 42* | 43 | 44* | 45 | 46* |
|---|---|---|---|---|---|---|---|---|
| SOAK TEMPERATURE (° C.) | 1050 | 1150 | 1250 | 1325 | 1050 | 1325 | 1050 | 1325 |
| SOAK TIME (hours) | 10 | 10 | 10 | 10 | 10 | 6 | 10 | 6 |
| FIRED PROPERTIES | | | | | | | | |
| Major crystalline phases | Cd | Cd | Cd | Cd | Cd | Cd | Cd | Cd |
| Minor crystalline phases | SrAS | SrAS | Sp, SrAS | Sp, SrAS | — | Sp, SrAS | — | Sp, SrAS |
| Trace crystalline phases | Sp | Sp | — | — | Sp, SrAS | — | Sp, SrAS | — |
| Cordierite a parameter (nm) | 0.9781 | — | — | — | — | — | — | — |
| Cordierite c parameter (nm) | 0.9388 | — | — | — | — | — | — | — |
| Cordierite mean crystal size (microns) | — | — | — | — | — | — | — | — |
| CTE 25–800° C. ($10^{-7}$/° C.) | 17.4 | 15.4 | 13.1 | 17.4 | 10.6 | 14.6 | 10.2 | 16.0 |
| Percent Open Porosity | — | — | — | — | 12.8 | — | 22.2 | — |
| Median Pore Diameter (microns) | — | — | — | — | 4.1 | — | 9.6 | — |

*Comparison Example
**Cd = cordierite-type phase, Sp = spinel, SrAS = $SrAl_2Si_2O_8$

TABLE 9

| EXAMPLE NUMBER | 47* | 48* | 49 | 50 | 51 | 52 | 53* | 54* |
|---|---|---|---|---|---|---|---|---|
| NOMINAL COMPOSITION OF CORDIERITE PHASE | | $Ba_{0.125}Mg_2Al_{4.25}Si_{4.75}O_{18}$ | | | | | $Ba_{0.25}Mg_2Al_{4.5}Si_{4.5}O_{18}$ | |
| OXIDE PERCENT IN GLASS | | | | | | | | |
| MgO | 13.40 | 13.40 | 13.40 | 13.40 | 13.40 | 13.40 | 13.00 | 13.00 |
| $Al_2O_3$ | 36.00 | 36.00 | 36.00 | 36.00 | 36.00 | 36.00 | 37.00 | 37.00 |
| $SiO_2$ | 47.40 | 47.40 | 47.40 | 47.40 | 47.40 | 47.40 | 43.60 | 43.60 |
| BaO | 3.18 | 3.18 | 3.18 | 3.18 | 3.18 | 3.18 | 6.19 | 6.19 |
| Median Particle Size of Glass Frit (microns) | 16 | 16 | 16 | 16 | 42 | 125 | 16 | 16 |
| SOAK TEMPERATURE (° C.) | 1050 | 1150 | 1250 | 1300 | 1325 | 1325 | 1050 | 1300 |
| SOAK TIME (hours) | 10 | 10 | 10 | 10 | 6 | 6 | 10 | 10 |
| FIRED PROPERTIES | | | | | | | | |
| Major crystalline phases | Cd | Cd | Cd | Cd | Cd | Cd | Cd | Cd |
| Minor crystalline phases | — | — | Sp, Cels | Sp, Cels | Sp | Sp | — | Sp, Cels |
| Trace crystalline phases | Sp, Cels | Sp, Cels | — | — | Cels | Cels | Sp, Cels | — |
| Cordierite a parameter (nm) | 0.9774 | — | — | — | — | — | 0.9789 | — |
| Cordierite c parameter (nm) | 0.9362 | — | — | — | — | — | 0.9374 | — |
| Cordierite mean crystal size (microns) | 23 | — | — | — | 38 | 41 | — | — |
| CTE 25–800° C. ($10^{-7}$/° C.) | 18.0 | 17.8 | 10.7 | 9.8 | 7.1 | 7.0 | 16.9 | 15.8 |
| Percent Open Porosity | — | — | — | — | 16.4 | 31.6 | — | — |
| Median Pore Diameter (microns) | — | — | — | — | 4.4 | 11.5 | — | — |

*Comparison Example. Example 53 also contained the addition of 5% crystalline cordierite powder in the extruded batch.
**Cd = cordierite-type phase, Sp = spinel, Cels = celsian ($BaAl_2Si_2O_8$)

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making a glass ceramic article, the method comprising:
   a) providing a glass having a glass compositional formula expressed in terms of moles of oxides selected from the group consisting of a first glass compositional formula of $2MgO+2Al_2O_3+5SiO_2$ and a second glass compositional formula of $(x/2)A_2O+yBO+2MgO+Al_2O_3+(5-x-2y)SiO_2$, wherein, when the glass is of the second formula, A is selected from the group consisting of sodium and potassium,
   B is selected from the group consisting of strontium and barium;
   and the sum of x and y is at least about 0.01;
   b) melting and quenching said glass;
   c) crushing said glass to a frit having a median particle diameter of no greater than about 150 micrometers;
   d) consolidating the crushed glass frit into a body;
   e) sintering the body for a sufficient time and temperature to devitrify the glass into a predominately cordierite phase of cordierite crystals or aggregates of near-parallel crystallites and to coarsen the size of the cordierite crystals or aggregates of near-parallel crystallites to yield microcracks in the subsequently cooled body; and f) cooling to yield a sintered body wherein when the glass is of the first glass compositional formula, the average size of the cordierite crystals or aggregates of near-parallel cordierite crystallites is less than about 70 micrometers, and the mean coefficient of thermal expansion from 22° C. to 800° C. is less than about $9 \times 10^{-7}$/° C., and when the glass is of the second glass compositional formula, the mean coefficient of thermal expansion from 22° C. to 800° C. is not more than about $14 \times 10^{-7}$/° C.

2. A method of claim 1 wherein the cordierite phase is made from the first glass compositional formula and wherein the glass is crushed to a frit having a median particle diameter of greater than about 20 micrometers and wherein the sintering temperature is greater than about 1050° C.

3. A method of claim 2 wherein the glass is crushed to a frit having a median particle diameter of greater than about 40 micrometers.

4. A method of claim 2 wherein the sintering temperature is greater than about 1200° C.

5. A method of claim 1 wherein the cordierite phase has a formula of $Na_xMg_2Al_{4+x}Si_{5-x}O_{18}$ where x is at least 0.01.

6. A method of claim 5 wherein the sintering temperature is greater than about 1200° C.

7. A method of claim 1 wherein the cordierite phase has a formula of $K_xMg_2Al_{4+x}Si_{5-x}O_{18}$ where x is about 0.01 to 0.15.

8. A method of claim 7 wherein the sintering temperature is greater than about 1200° C.

9. A method of claim 7 wherein the glass is crushed to a frit having a median particle diameter of at least 15 micrometers.

10. A method of claim 7 wherein the glass is crushed to a frit having a median particle diameter of less than about 15 micrometers and wherein the sintering temperature is greater than about 1050° C.

11. A method of claim 1 wherein the cordierite phase has a formula of $K_xMg_2Al_{4+x}Si_{5-x}O_{18}$ and x is greater than 0.15 but no more than 0.35.

12. A method of claim 11 wherein the glass is crushed to a frit having a median particle diameter of less than about 20 micrometers and wherein the sintering temperature is greater than about 1200° C.

13. A method of claim 11 wherein the glass is crushed to a frit having a median particle diameter of not less than about 20 micrometers.

14. A method of claim 13 wherein the sintering temperature is greater than 1200° C.

15. A method of claim 11 wherein the cordierite phase has a formula of $K_xMg_2Al_{4+x}Si_{5-x}O_{18}$ and x is greater than 0.35 but not more than 0.6.

16. A method of claim 15 wherein the glass is crushed to a frit having a median particle diameter of less than about 20 micrometers and wherein the sintering temperature is greater than about 1200° C.

17. A method of claim 16 wherein the sintering temperature is greater than about 1300° C.

18. A method of claim 15 wherein the glass is crushed to a frit having a median particle diameter of at least about 20 micrometers.

19. A method of claim 18 wherein the glass is crushed to a frit having a median particle diameter of at least about 35 micrometers.

20. A method of claim 18 wherein the sintering temperature is greater than about 1200° C.

21. A method of claim 1 wherein the cordierite phase has the formula $Sr_yMg_2Al_{4+2y}Si_{5-2y}O_{18}$ wherein y is greater than about 0.01 but not more than about 0.20.

22. A method of claim 21 wherein the glass is crushed to a frit having a median particle diameter of at least about 20 micrometers.

23. A method of claim 1 wherein the cordierite phase has the formula $Sr_yMg_2Al_{4+2y}Si_{5-2y}O_{18}$ wherein y is greater than about 0.20 but less than about 0.50 and wherein the firing temperature is less than about 1325° C.

24. A method of claim 23 wherein the glass is crushed to a frit having a median particle diameter of at least about 20 micrometers.

25. A method of claim 1 wherein the cordierite phase has the formula $Ba_yMg_2Al_{4+2y}Si_{5-2y}O_{18}$ wherein y is at least 0.01 but less than 0.25.

26. A method of claim 25 wherein the glass is crushed to a frit having a median particle diameter of less than about 20 micrometers and wherein the sintering temperature is greater than about 1200° C.

27. A method of claim 25 wherein the glass is crushed to a frit having a median particle diameter of greater than about 20 micrometers.

* * * * *

UNITED STATES PATENT AND TRADEMARK OFFICE
CERTIFICATE OF CORRECTION

PATENT NO. : 6,300,263 B1
DATED : October 9, 2001
INVENTOR(S) : Merkel

Page 1 of 1

It is certified that error appears in the above-identified patent and that said Letters Patent is hereby corrected as shown below:

Column 15,
Line 65, "$(x/2)A_2O+yBO+2MgO+Al_2O_3+(5-x-2y)SiO_2$" should be
-- $(x/2)A_2O+yBO+2MgO+[(4+x+2y)/2]Al_2O_3+(5-x-2y)SiO_2$ --

Signed and Sealed this

Seventh Day of May, 2002

Attest:

Attesting Officer

JAMES E. ROGAN
*Director of the United States Patent and Trademark Office*